United States Patent
Yi et al.

(10) Patent No.: US 11,768,938 B2
(45) Date of Patent: Sep. 26, 2023

(54) MOBILE APPLICATION MALICIOUS BEHAVIOR PATTERN DETECTION METHOD BASED ON API CALL GRAPH EXTRACTION AND RECORDING MEDIUM AND DEVICE FOR PERFORMING THE SAME

(71) Applicant: Foundation of Soongsil University-Industry Cooperation, Seoul (KR)

(72) Inventors: Jeong Hyun Yi, Seoul (KR); Jin Sung Kim, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 325 days.

(21) Appl. No.: 17/289,172

(22) PCT Filed: Nov. 26, 2020

(86) PCT No.: PCT/KR2020/016913
§ 371 (c)(1),
(2) Date: Apr. 27, 2021

(87) PCT Pub. No.: WO2022/107963
PCT Pub. Date: May 27, 2022

(65) Prior Publication Data
US 2022/0164447 A1 May 26, 2022

(30) Foreign Application Priority Data
Nov. 20, 2020 (KR) .................. 10-2020-0157078

(51) Int. Cl.
*G06F 21/56* (2013.01)
*G06F 21/52* (2013.01)

(52) U.S. Cl.
CPC ........... *G06F 21/566* (2013.01); *G06F 21/52* (2013.01); *G06F 2221/033* (2013.01)

(58) Field of Classification Search
CPC ... G06F 21/566; G06F 21/52; G06F 2221/033
(Continued)

(56) References Cited

U.S. PATENT DOCUMENTS 10,558,809 B1 * 2/2020 Joyce ............... G06N 5/046
10,956,566 B2 * 3/2021 Shu ................. G06F 21/554
(Continued)

FOREIGN PATENT DOCUMENTS

KR 10-1228899 B1 2/2013
KR 10-1589656 B1 1/2016
(Continued)

OTHER PUBLICATIONS

Ammar Ahmed E. Elhadi, Malware Detection Based on Hybrid Signature Behaviour Application Programming Interface Call Graph; Citeseer:2012; pp. 283-288.*
(Continued)

*Primary Examiner* — Monjur Rahim
(74) *Attorney, Agent, or Firm* — Stein IP, LLC

(57) ABSTRACT

A mobile application malicious behavior pattern detection method based on Application Programming Interface (API) call graph extraction includes extracting an API Call Graph (ACG) representing an API call flow from benign applications and applications which perform malicious behavior, generating and vectorizing a training dataset for deep learning using the extracted ACG, generating a deep learning algorithm prediction model by training with the vectorized training dataset, extracting ACG features used in the malicious behavior from the generated prediction model and extracting a malicious behavior pattern from an intersection of the malicious applications, and classifying an application
(Continued)

which performs malicious behavior through similarity comparison between the extracted malicious behavior pattern and a pattern extracted from the target application. Accordingly, it is possible to detect the malicious behavior itself using the ACG representing an API call flow.

11 Claims, 8 Drawing Sheets

(58) Field of Classification Search
USPC .......................................................... 726/23
See application file for complete search history.

(56) References Cited

U.S. PATENT DOCUMENTS

| | | | |
|---|---|---|---|
| 11,119,883 B1* | 9/2021 | Eberlein | G06F 11/3006 |
| 11,157,620 B2* | 10/2021 | Fang | G06F 21/577 |
| 11,316,891 B2* | 4/2022 | Sbandi | H04L 63/1441 |
| 11,650,834 B1* | 5/2023 | Varada | G06Q 10/067 |
| | | | 717/104 |
| 2018/0039779 A1* | 2/2018 | Li | G06F 21/56 |
| 2018/0373865 A1* | 12/2018 | Acar | G06F 21/554 |
| 2020/0026851 A1* | 1/2020 | Dhankha | G06F 21/554 |
| 2021/0287108 A1* | 9/2021 | Hwang | G06N 5/04 |
| 2022/0129551 A1* | 4/2022 | Collier | G06F 21/31 |

FOREIGN PATENT DOCUMENTS

| | | |
|---|---|---|
| KR | 10-2017-0081386 A | 7/2017 |
| KR | 10-1803890 B1 | 12/2017 |
| KR | 10-1880686 B1 | 7/2018 |
| KR | 10-1969572 B1 | 4/2019 |
| KR | 10-2005107 B1 | 7/2019 |
| KR | 10-2020-0071822 A | 6/2020 |

OTHER PUBLICATIONS

Taejoo Cho et al., "Security Assessment of Code Obfuscation Based on Dynamic Monitoring in Android Things", Apr. 12, 2017, p. 6361-6371, vol. 5, 2017, IEEE Access.

Kichang Kim et al., "Risk Assessment Scheme for Mobile Applications Based on Tree Boosting", Mar. 9, 2020, p. 48503-48514, vol. 8, 2020, IEEE Access.

Omer Tripp et al., "TAJ: Effective Taint Analysis of Web Applications". Jun. 2009.

Muhammad Ikram et al., "DaDiDroid: An Obfuscation Resilient Tool for Detecting Android Malware via Weighted Directed Call Graph Modelling" (Aug. 2019).

Jinsung Kim. "Malicious Behavior Pattern Detection Scheme for Mobile Application based on CNN". Department of Software Convergence Graduate School of Soongsil University, Jun. 2020, Seoul, Republic of Korea.

* cited by examiner

| No. | API Call Graph list | No. | API Call Graph list |
|---|---|---|---|
| 1 | java.util -> android.preference | 11 | org.xml.pull.v1 -> java.security |
| 2 | java.lang -> javax.xml.transform.stream | 12 | Android.graphics -> android.graphics |
| 3 | android.content -> android.os | 13 | android.widget -> android.view |
| 4 | android.media -> java.lang | 14 | java.util.concurrent -> java.util |
| 5 | java.lang -> android.content.pm | 15 | android.text -> android.net |
| 6 | android.widget -> org.json | 16 | java.lang -> javax.xml.transform |
| 7 | org.xml.pull.v1 -> org.apache.httpconnscheme | 17 | org.xml.pull.v1 -> android.view.animation |
| 8 | android.os -> android.os | 18 | java.text -> java.text |
| 9 | android.provider -> android,app | ... | ... |
| 10 | android.content -> android.text | 8545 | android.os -> com.google.android.gms.cast.framework.meida.widget |

FIG. 5

| No. | Number of feature API call graphs | Pattern list | |
|---|---|---|---|
| 1 | 11 | Pattern 1 | 'android.support.v4->java.util', 'java.util->java.lang', 'android.view.animation->java.lang', 'java.io->java.lang', 'android.support.v4->android.support.v7', 'android.preference->java.lang', 'android.text->java.lang', 'android.view->android.util', 'android.widget->android.view', 'android.os->android.os', 'java.io->java.io' |
| 2 | 15 | Pattern 1 | 'java.lang->android.content', 'android.os->android.view', 'java.util->java.lang', 'android.app->android.content', 'java.io->java.lang', 'android.preference->java.lang', 'android.content->android.app', 'android.os->android.preference', 'android.view->android.util', 'android.widget->android.view', 'android.os->android.os', 'java.io->java.io', 'android.app->android.widget', 'java.lang->android.app', 'java.lang->android.widget' |
| ... | ... | ... | ... |
| 493 | 727 | Pattern 1 | 'java.lang->dalvik.system', 'android.util->android.hardware', 'java.text->java.util', 'java.nio->java.util.zip', 'android.util->javax.security.cert', 'android.support.v4.app->android.hardware', ..., 'android.text->java.util.stream', 'android.support.v7.widget.helper->android.support.v7.widget.helper', 'android.support.design.widget->android.support.v7.text' |

FIG. 6

| Number of feature API call graphs | Jaccard similarity | Number of feature API call graphs | Jaccard similarity |
|---|---|---|---|
| 11 | 1.0 | 26 | 0.5 |
| 15 | 1.0 | 27 | 1.0 |
| 18 | 1.0 | 28 | 1.0 |
| 19 | 1.0 | ... | ... |
| 20 | 1.0 | 706 | 1.0 |
| 21 | 1.0 | 713 | 1.0 |
| 22 | 1.0 | 714 | 0.9943977 |
| 23 | 1.0 | 715 | 0.995804 |
| 24 | 0.625 | 716 | 0.994413 |
| 25 | 1.0 | 727 | 1.0 |

FIG. 7

MOBILE APPLICATION MALICIOUS BEHAVIOR PATTERN DETECTION METHOD BASED ON API CALL GRAPH EXTRACTION AND RECORDING MEDIUM AND DEVICE FOR PERFORMING THE SAME

TECHNICAL FIELD

The present disclosure relates to a mobile application malicious behavior pattern detection method based on Application Programming Interface (API) call graph extraction and a recording medium and a device for performing the same, and more particularly, to technology that analyzes and detects malicious behavior itself by the deep learning technique using an API call graph representing usage relationships of APIs containing the actual execution functions on a mobile application.

BACKGROUND ART

With the growth of IoT markets, IoT devices are increasing year by year and it is predicted that the total will reach 25 billion by 2021. In this environment, as mobile devices become important, mobile application markets are growing fast. So, the amount of mobile application malicious code is also increasing day by day.

According to some reports, the number of malicious applications increased from about 20 million in 2017 to about 36 million in 2019. About 15 malicious applications per minute on average are being created. Among operating systems (OSs) used in mobile devices all over the world, Android has a very large share of 74% as of December 2019. Hence, Android mobile applications are also being used at a high rate.

However, Android applications are based on the open market policy and easy for anyone to copy, modify and distribute in an illegal and unauthorized manner, so vulnerabilities are found in Android applications. Thus, repackaging attacks cause damage such as financial losses and personal information and password leaks.

Accordingly, it is necessary to detect applications which perform malicious behavior among mobile applications more precisely to protect users. In the existing malicious behavior detection, there are analysis methods based on permission, description and user review, but they have clear limitations in detecting malicious behavior, and accordingly there is a need for methods of accurately detecting malicious behavior itself.

Recently, many studies are being made to detect malicious applications by extracting Application Programming Interface (API) to detect the actual execution.

However, since detection using only API detects malicious applications by checking whether API was used, in case where benign applications and malicious applications use the same API, benign applications may be incorrectly classified as malicious. Additionally, malicious applications having data leak that often occurs on Android may be incorrectly classified as benign.

RELATED LITERATURES

Patent Literatures (Patent Literature 1) KR 10-2005107 B1
(Patent Literature 2) KR 10-1589656 B1
(Patent Literature 3) KR 10-1228899 B1

Non-Patent Literatures (Non-Patent Literature 1) T. Cho, H. Kim, and J. H. Yi, "Security Assessment of Code Obfuscation based on Dynamic Monitoring in Android Things," IEEE Access, vol. 5, pp. 6361-6371, 2017.
(Non-Patent Literature 2) K. Kim, J. Kim, E. Ko, and J. H. Yi, "Risk Assessment Scheme for Mobile Applications based on Tree Boosting," IEEE Access, vol. 8, pp. 48503-48514, 2020.

DISCLOSURE

Technical Problem

In view of this circumstance, the present disclosure is directed to providing a mobile application malicious behavior pattern detection method based on Application Programming Interface (API) call graph extraction.

The present disclosure is further directed to providing a recording medium having recorded thereon a computer program for performing the mobile application malicious behavior pattern detection method based on API call graph extraction.

The present disclosure is further directed to providing a device for performing the mobile application malicious behavior pattern detection method based on API call graph extraction.

Technical Solution

To achieve the above-described object of the present disclosure, a mobile application malicious behavior pattern detection method based on Application Programming Interface (API) call graph extraction according to an embodiment includes extracting an API Call Graph (ACG) representing an API call flow from benign applications and applications which perform malicious behavior, generating and vectorizing a training dataset for deep learning using the extracted ACG, generating a deep learning algorithm prediction model by training with the vectorized training dataset, extracting ACG features used in the malicious behavior from the generated prediction model and extracting a malicious behavior pattern from an intersection of the malicious applications, and classifying an application which performs malicious behavior through similarity comparison between the extracted malicious behavior pattern and a pattern extracted from the target application.

In an embodiment of the present disclosure, the mobile application malicious behavior pattern detection method based on API call graph extraction may further include crawling and extracting framework API information from an Android homepage, and storing the extracted framework API information.

In an embodiment of the present disclosure, extracting the ACG may include extracting the ACG representing a call flow using taint analysis.

In an embodiment of the present disclosure, generating and vectorizing the training dataset may include generating the training dataset using all the extracted ACGs, and vectorizing the generated training dataset for deep learning.

In an embodiment of the present disclosure, extracting the malicious behavior pattern may include extracting the ACG features used in the malicious behavior using a deep learning visualization technique from the trained prediction model by the deep learning visualization technique, and grouping malicious applications having similar ACGs in the extracted ACG features and calculating the intersection of the malicious applications to extract the malicious behavior pattern.

In an embodiment of the present disclosure, the risk application classifier may include listing the extracted malicious behavior patterns and measuring a Jaccard similarity between the malicious behavior pattern list and the ACG extracted from the target application.

To achieve another object of the present disclosure, a computer-readable storage medium according to an embodiment has recorded thereon a computer program for performing the mobile application malicious behavior pattern detection method based on API call graph extraction.

To achieve still another object of the present disclosure, a mobile application malicious behavior pattern detection device based on API call graph extraction according to an embodiment includes an API call graph extractor to extract an ACG representing an API call flow from benign applications and applications which perform malicious behavior, a training dataset vectorizer to generate and vectorize a training dataset for deep learning using the extracted ACG, a machine learner to generate a deep learning algorithm prediction model by training with the vectorized training dataset, a pattern extractor to extract ACG features used in the malicious behavior from the generated prediction model and extract a malicious behavior pattern from an intersection of the malicious applications, and a risk application classifier to classify an application which performs malicious behavior through similarity comparison between the extracted malicious behavior pattern and a pattern extracted from the target application.

In an embodiment of the present disclosure, the mobile application malicious behavior pattern detection device based on API call graph extraction may further include a framework API crawler to extract framework API information from an Android homepage, and a framework API database to store the extracted framework API information.

In an embodiment of the present disclosure, the API call graph extractor may extract the ACG representing a call flow using taint analysis.

In an embodiment of the present disclosure, the training dataset vectorizer may include a training dataset generator to generate the training dataset using all the extracted ACGs, and an embedding vectorizer to vectorize the generated training dataset for deep learning.

In an embodiment of the present disclosure, the pattern extractor may include an API call graph feature extractor to extract the ACG features used in the malicious behavior using a deep learning visualization technique from the trained prediction model by the deep learning visualization technique, and a malicious behavior pattern extractor to group malicious applications having similar ACGs in the extracted ACG features and calculate the intersection of the malicious applications to extract the malicious behavior pattern.

In an embodiment of the present disclosure, the risk application classifier may include a Jaccard similarity comparator to list the extracted malicious behavior patterns and measure a Jaccard similarity between the malicious behavior pattern list and the ACG extracted from the target application.

Advantageous Effects

According to the mobile application malicious behavior pattern detection method based on Application Programming Interface (API) call graph extraction, it is possible to classify malicious applications by detecting the actual execution running in the malicious applications using an API call graph (ACG) representing an API call flow, and analyzing malicious behavior patterns in the malicious applications using the deep learning technique. Accordingly, it is possible to detect malicious behavior itself, thereby preventing damage caused by malicious behavior by predicting and detecting malicious behavior.

DESCRIPTION OF DRAWINGS

FIG. 5 is a diagram showing an example of an API call graph feature list as the training result of FIG. 4.

FIG. 6 is a diagram showing an example of a malicious pattern list generated according to the present disclosure.

FIG. 7 is a diagram showing a measurement reference value of Jaccard similarity as a reference for classifying as benign or malicious.

BEST MODE

Figure 1:
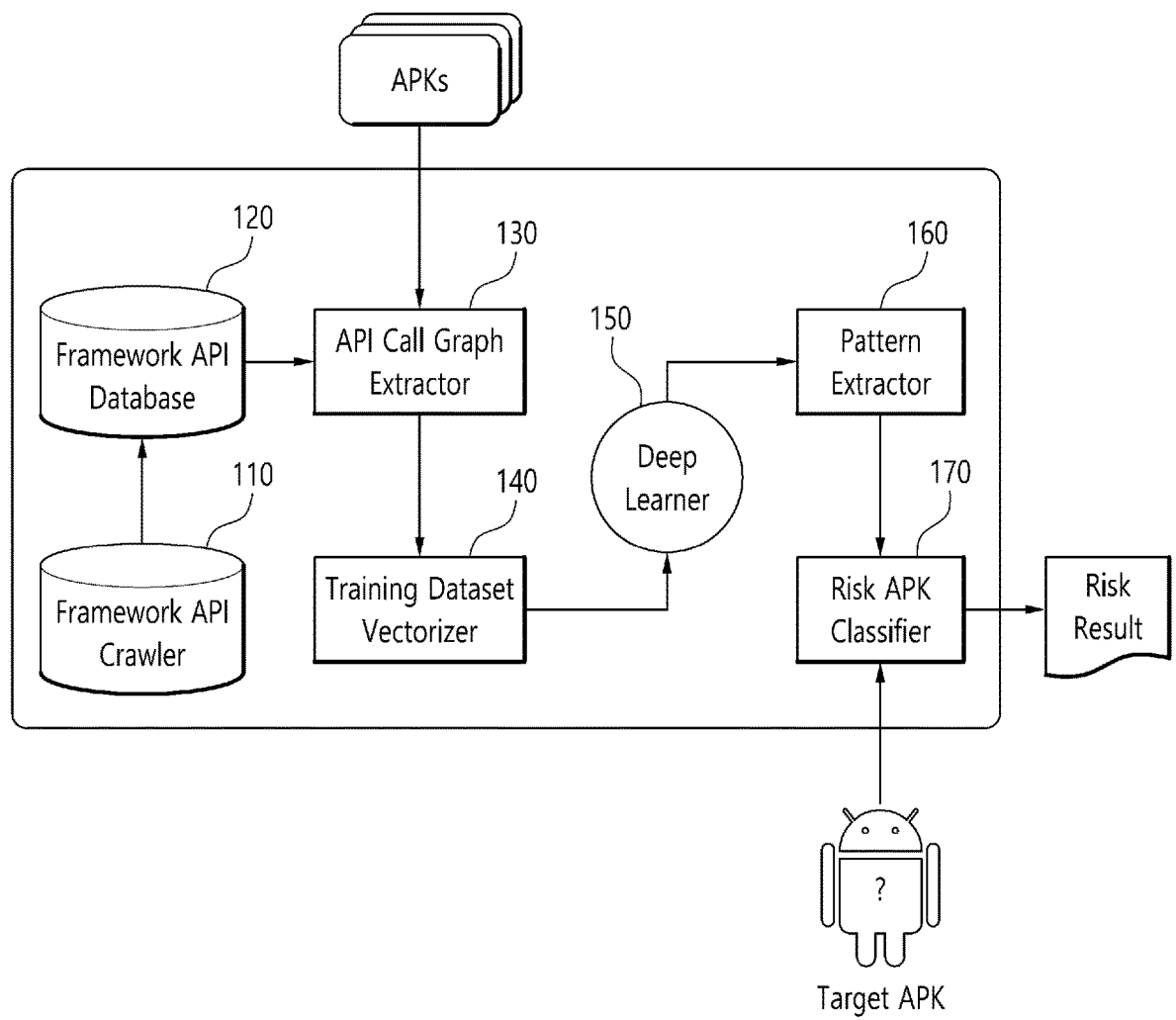
FIG. 1 is a block diagram of a mobile application malicious behavior pattern detection device based on Application Programming Interface (API) call graph extraction according to an embodiment of the present disclosure.

The following detailed description of the present disclosure is made with reference to the accompanying drawings, in which particular embodiments for practicing the present disclosure are shown for illustration purposes. These embodiments are described in sufficiently detail for those skilled in the art to practice the present disclosure. It should be understood that various embodiments of the present disclosure are different but do not need to be mutually exclusive. For example, particular shapes, structures and features described herein in connection with one embodiment may be embodied in other embodiment without departing from the spirit and scope of the present disclosure. It should be further understood that changes may be made to the positions or placement of individual elements in each disclosed embodiment without departing from the spirit and scope of the present disclosure. Accordingly, the following detailed description is not intended to be taken in limiting senses, and the scope of the present disclosure, if appropriately described, is only defined by the appended claims along with the full scope of equivalents to which such claims are entitled. In the drawings, similar reference signs denote same or similar functions in many aspects.

Hereinafter, the preferred embodiments of the present disclosure will be described in more detail with reference to the accompanying drawings.

Figure 2:
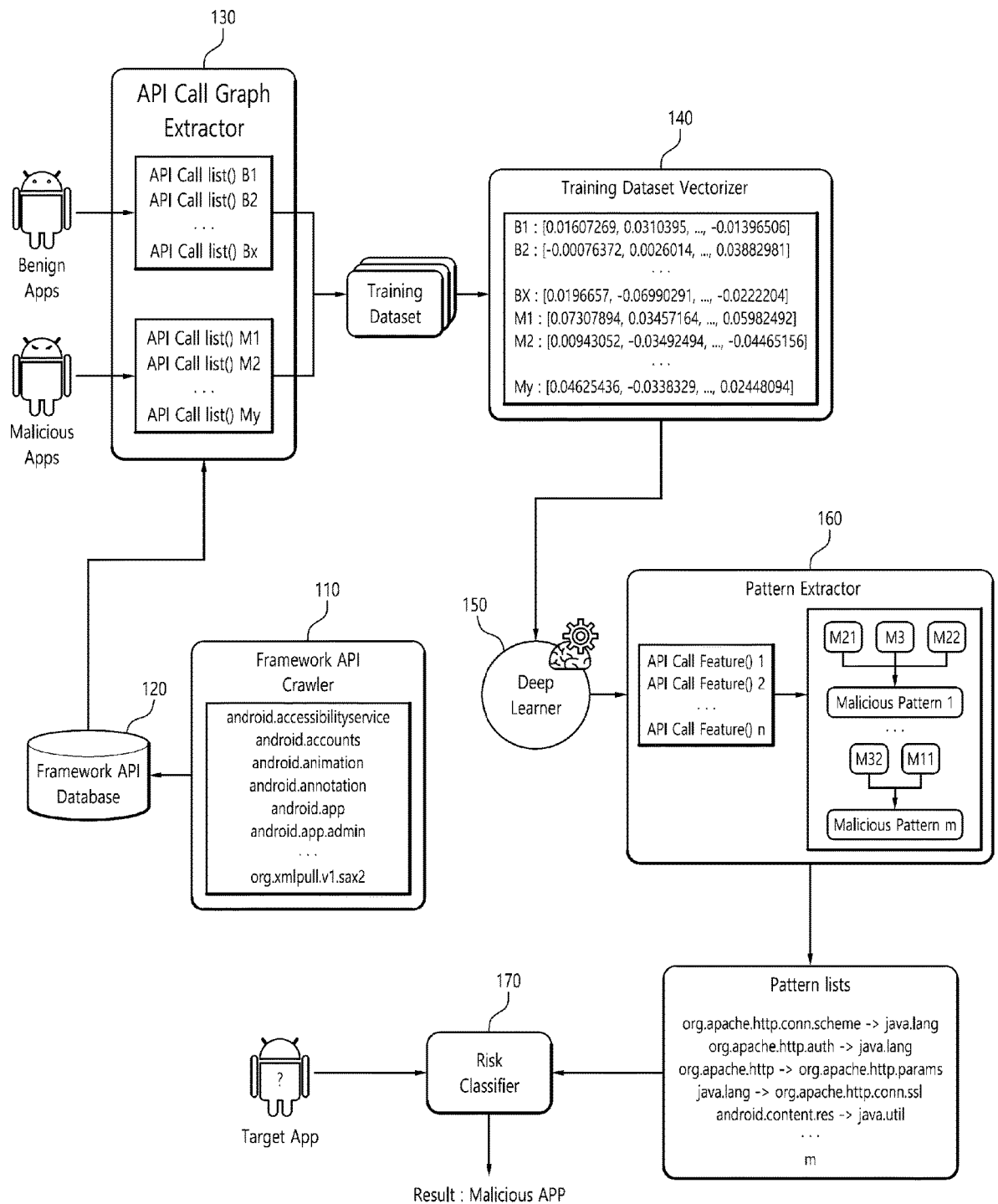
FIG. 2 is a diagram illustrating the operation of the mobile application malicious behavior pattern detection device of FIG. 1.

FIG. 1 is a block diagram of a mobile application malicious behavior pattern detection device based on Application Programming Interface (API) call graph extraction according to an embodiment of the present disclosure. FIG. 2 is a diagram illustrating the operation of the mobile application malicious behavior pattern detection device of FIG. 1.

The mobile application malicious behavior pattern detection device 10 based on API call graph extraction (hereinafter, the device) according to the present disclosure uses an API call graph (ACG) representing usage relationships of APIs based on APIs containing the actual execution functions on a mobile application. Additionally, a malicious behavior pattern is extracted to analyze and detect malicious behavior itself by the deep learning technique using the ACG.

The present disclosure extracts the ACG using the taint analysis technique based on APIs for mobile applications. Subsequently, after training a prediction model using the deep learning algorithm, features are extracted using the deep learning visualization technique (Gradient-weighted Class Activation Map) capable of extracting features determined as important in the training.

A malicious behavior pattern that is common in malicious applications is detected using the extracted features. It is possible to detect malicious behavior itself, thereby achieving accurate and rapid malicious application pattern detection.

Referring to FIGS. 1 and 2, the device 10 according to the present disclosure includes an API call graph extractor 130, a training dataset vectorizer 140, a machine learner 150, a pattern extractor 160 and a risk application classifier 170. The device 10 may further include a framework API crawler 110 and a framework API database 120.

The device 10 of the present disclosure may run software (application) for performing mobile application malicious behavior pattern detection based on API call graph extraction installed thereon, and the framework API crawler 110, the framework API database 120, the API call graph extractor 130, the training dataset vectorizer 140, the machine learner 150, the pattern extractor 160 and the risk application classifier 170 may be controlled by the software for performing automatic validation of API call running on the device 10.

The device 10 may be a separate terminal or modules of the terminal. Additionally, the framework API crawler 110, the framework API database 120, the API call graph extractor 130, the training dataset vectorizer 140, the machine learner 150, the pattern extractor 160 and the risk application classifier 170 may be formed as an integrated module or at least one module. However, to the contrary, each element may be formed as a separate module.

The device 10 may be mobile or fixed. The device 10 may be in the form of a server or an engine, and may be interchangeably used with a device, an apparatus, a terminal, user equipment (UE), a mobile station (MS), a wireless device and a handheld device.

The device 10 may execute or create a variety of software based on an Operation System (OS), namely, a system. The OS is a system program for enabling software to use the hardware of the device, and may include mobile computer OS including Android OS, iOS, Windows Mobile OS, Bada OS, Symbian OS and Blackberry OS and computer OS including Windows family, Linux family, Unix family, MAC, AIX and HP-UX.

The framework API crawler 110 extracts framework API information from the Android homepage. The Android framework API information includes, for example, package, class, method information.

The framework API database 120 stores the extracted framework API information. The framework API database 120 stores the package, class, method information extracted by the framework API crawler 110.

The API call graph extractor 130 extracts an ACG representing an API call flow from benign applications and applications which perform malicious behavior. The call flow may use the taint analysis technique.

In an embodiment, one of API call graph extraction tools using the taint analysis technique is Flowdroid. Flowdroid is a tool for Android application optimization and API call graph extraction based on Soot which is a Java optimization framework.

Flowdroid extracts xml, .dex, manifest files from first, apk files. Subsequently, an entry point is generated using an Android API framework list corresponding to 142 sources as methods importing data and 159 sinks as methods exporting data.

APIs exported from the defined source to sink in the main method using the generated entry point are determined as data leak and a call graph of the APIs is extracted. Subsequently, the extracted API call graphs are represented in a list. Finally, 444 API call graph lists defined by Android API package unit are generated.

The present disclosure extracts each API call graph from malicious applications and benign applications. Subsequently, the extracted API call graphs are grouped according to call to form a call sequence. Finally, the call sequence is converted into API format for use in the training.

The training dataset vectorizer 140 generates and vectorizes a training dataset for deep learning using the extracted ACGs.

To use natural language for deep learning, character is converted into numeric by mapping each word to its unique integer. The present disclosure incorporates the extracted API call graphs into a word dictionary, and assigns an integer index by mapping to integer. The mapped API call graphs are randomly vectorized into dense vectors using the embedding layer. When vectorization is performed by word embedding, it is possible to capture a large amount of information in low dimension, thereby increasing the training speed.

The machine learner 150 generates a deep learning algorithm prediction model by training with the vectorized training dataset.

The training dataset vectorizer 140 trains a convolutional neural networks (CNN) with the vectorized API call graphs.

Figure 3:
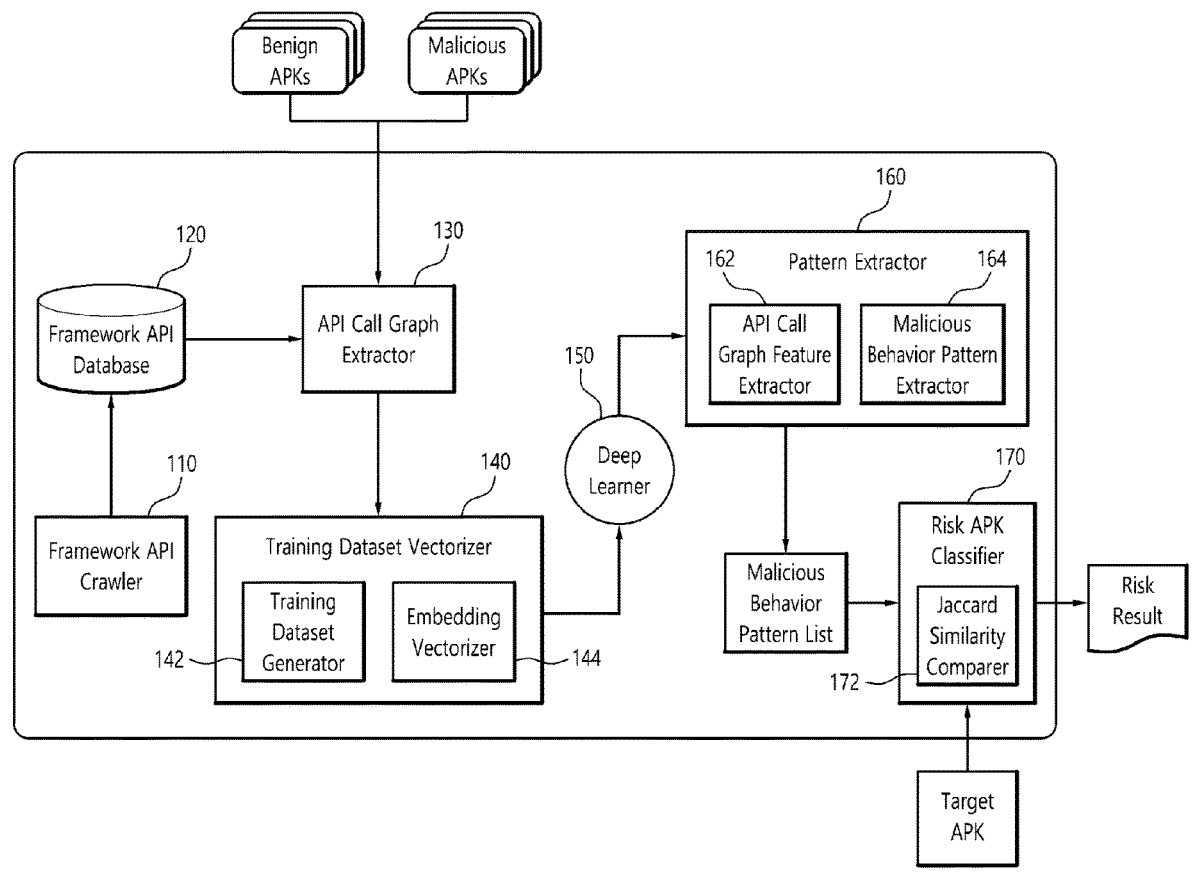
FIG. 3 is a block diagram showing the detailed configuration of the mobile application malicious behavior pattern detection device of FIG. 1.

Referring to FIG. 3, the training dataset vectorizer 140 may include a training dataset generator 142 to generate a training dataset using all the extracted ACGs and an embedding vectorizer 144 to vectorize the generated training dataset for deep learning.

After operation in the one-dimensional convolution layer used in natural language processing using the CNN algorithm, pooling is performed. The convolution layer performs the convolution operation using p filters having the height of q.

Subsequently, average pooling that uses the entire data of the generated feature map, not specific large data, is applied. The average pooling result value is flattened and fully connected. Finally, a prediction result value is derived using the activation function softmax.

The pattern extractor 160 extracts an ACG feature used in malicious behavior from the generated prediction model and extracts a malicious behavior pattern from the intersection of malicious applications.

Referring to FIG. 3, the pattern extractor 160 may include an API call graph feature extractor 162 and a malicious behavior pattern extractor 164.

The API call graph feature extractor 162 extracts an ACG feature used in malicious behavior using the deep learning visualization technique from the trained prediction model by the deep learning visualization technique.

For example, the feature is extracted from the trained prediction model using Gradient-weighted Class Activation Map (Grad-CAM). The Grad-CAM calculates a gradient value using backpropagation. An equation for the Grad-CAM is given as the following Equation 1.

$$L^c_{Grad\ CAM} = \text{ReLU}\left(\sum_k \alpha^c_k f_k(x, y)\right) \quad \text{[Equation 1]}$$

Here, ReLU is a deep learning activation function, $\alpha_k^c$ is a weight for the feature, and $f_k(x,y)$ is a vector feature map of the Convolution Layer. When Grad-CAM is calculated, the API call graph feature is extracted. Subsequently, only a feature dataset is selected from the training dataset using the extracted feature dataset, and a training dataset is built again.

In detail, a heat map is extracted to identify an API call graph that became a high determination reference of a result value in the trained CNN using the Grad CAM technique. To extract the heat map, a gradient value $$\frac{\partial S_c}{\partial F_k}$$

is calculated using data of the feature map $f_k(x,y)$ in the convolution layer of the trained CNN and the trained prediction result $S_c$.

Subsequently, the heat map intended to finally obtain is obtained by calculating the weight value $\alpha_k^c$ for the prediction result using the gradient value and multiplying by the feature map. In this instance, as the heat map value is larger, it indicates an important feature in classifying malicious applications as malicious.

Accordingly, to detect malicious behavior, API call graphs in which the extracted heat map value is positive number are extracted and used to generate a pattern of malicious applications. In this instance, the extracted value is called an API call graph feature.

The malicious behavior pattern extractor 164 groups malicious applications having similar ACGs in the ACG features extracted by the API call graph feature extractor 162 and calculates the intersection of malicious applications to extract a malicious behavior pattern.

In other words, a pattern is extracted by grouping malicious applications having the same number of feature training datasets among malicious applications using the feature training dataset.

For example, when the number of API call graphs of API call graph feature list( ) extracted from malicious application A is 11 and the number of API call graph feature list( ) extracted from malicious application B is 11, A and B are determined as malicious applications having the same pattern, and a pattern is extracted by calculating the intersection of the features of A and B.

When the number of the extracted intersections is less than half of the number of ACGs, 11, the intersection of A and B is not used as the pattern, and 11 API call graph features of each of A and B are used as the malicious pattern. One or more patterns may be extracted per number.

The risk application classifier 170 classifies an application which performs malicious behavior through similarity comparison between the extracted malicious behavior pattern and a pattern extracted from the target application.

Referring to FIG. 3, the risk application classifier 170 may include a Jaccard similarity comparator 172. The Jaccard similarity comparator 172 lists the extracted malicious behavior patterns, and measures a Jaccard similarity between the malicious behavior pattern list and the ACG extracted from the target application. Malicious applications are classified using the measured similarity.

The Jaccard Similarity is measured with a pattern having the same number of API call graph features in the malicious behavior pattern list using the malicious application dataset. An equation for the Jaccard similarity is given as the following Equation 2.

$$J(A, B) = \frac{|A \cap B|}{|A \cup B|} = \frac{|A \cap B|}{|A| + |B| - |A \cap B|} \quad \text{[Equation 2]}$$

The measured Jaccard similarity score is set as a reference point, and in the case of an equal or higher score, the application may be classified as malicious, and in the case of a lower score, the application may be classified as benign.

Hereinafter, the experimental setup and experimental evaluation for the proposed CNN based mobile application malicious behavior pattern detection scheme will be described.

The experimental environment uses Intel® Xeon® W-2123 4-core 3.60 GHz CPU and 32 GB RAM, NVIDIA Quadro P4000, Windows 10 pro, and for API call graph extraction, Flowdroid 2.0 version, Python 3.7.2 version and Tensorflow 1.14.0, Keras 2.2.4 version.

For the training dataset, applications available in 2018 are used, and 10,000 benign applications randomly selected in Google Play Store using the program created by Androzoo and top 10,000 highest capacity malicious applications among applications provided in VirusShare are used.

Training Dataset. The framework API list is created using Framework APIs provided by Android and Google, and API call graphs are extracted from malicious and benign applications and used to build a training dataset. To minimize the amount of training dataset, APIs use package, the unit provided by Android. The use of package unit reduces the number of APIs, and helps Android APIs changing slowly to handle rapidly.

A total of 444 API packages are used in the form of a word such as API→API when extracted as API call graphs. It can be seen that a total of 444×444 API call graph lists are generated. Subsequently, an optimized API call graph is extracted by removing overlaps.

Feature Selection. After training using the CNN technique, weight values are obtained by applying Grad CAM and used as features. For fast CNN training, a basic CNN model is built using only one convolution layer and only one pooling layer. Subsequently, epoch, the parameter repeating the training is set to 50, and a learning model having the highest accuracy and lowest loss is stored and used.

Figure 4:
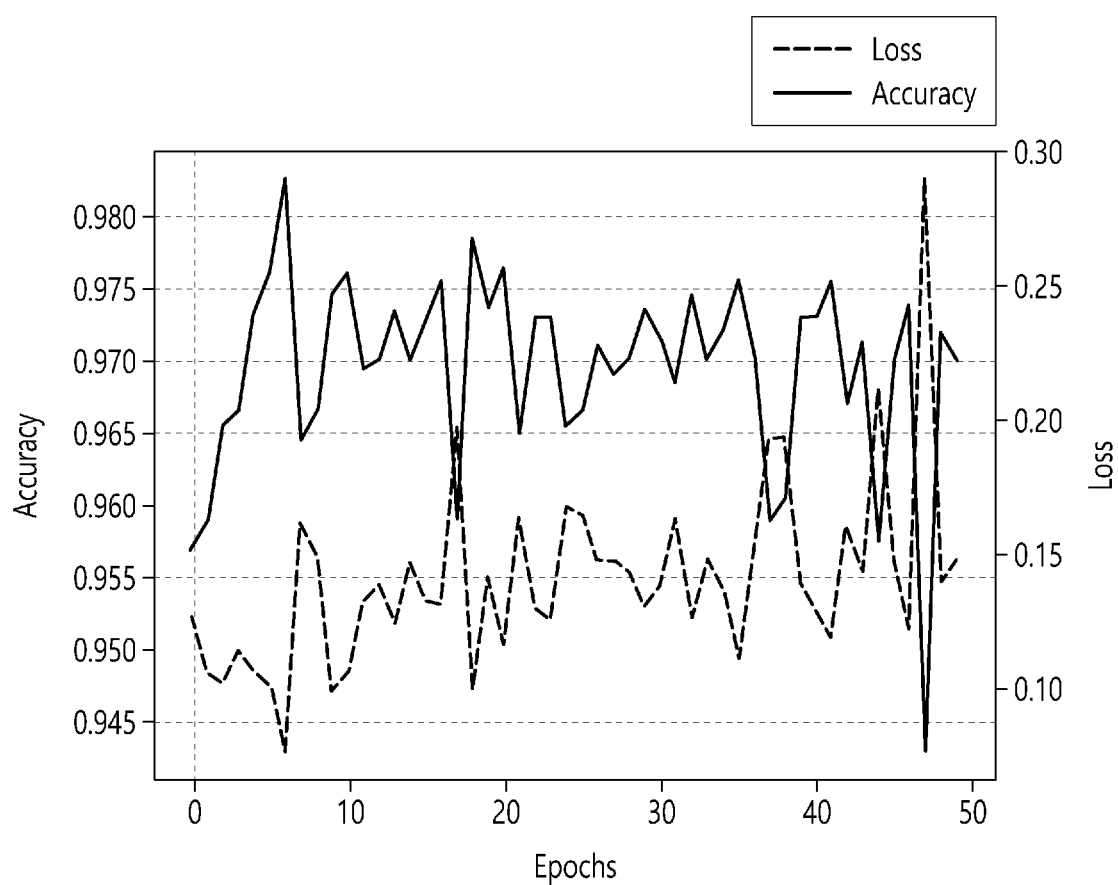
FIG. 4 is a graph showing a training result according to the present disclosure.

When epoch is 7, it results the best performance of 99.71% accuracy and 0.0104 loss, and the model is stored and used. Subsequently, when the heat map is extracted by applying Grad CAM, about 8,545 features are identified as features that affect the weight value in classifying as malicious applications. The training result is as shown in FIG. 4 and the API call graph feature list is as shown in FIG. 5.

API Pattern. Patterns used only in malicious applications are extracted using the intersection of API call graph features of FIG. 5 extracted from malicious applications through Grad CAM. API call graphs are extracted for each application using only 8,545 API call graphs selected as features to extract the patterns, and based on malicious applications having the smallest number of API call graphs, 11 to 727 intersections are extracted to generate malicious patterns. The generated pattern list is as shown in FIG. 6.

Subsequently, Jaccard similarity values with malicious applications are calculated using 493 patterns generated. The smallest one of the Jaccard similarity values is used to determine to be benign or malicious. The Jaccard similarity measurement results are as below. The Jaccard similarity values of malicious and benign applications are measured relatively clearly using the generated patterns. It can be seen that the actual behavior patterns of applications which perform malicious behavior and applications which normally run are different.

Experimental Results. The experiment was performed by classifying 10,000 malicious applications and 10,000 benign applications using the extracted malicious behavior pattern lists of FIG. 6.

Determination as to whether it is benign or malicious is performed by comparing the previously generated pattern lists with API call graph features of a target application using the Jaccard similarity values of FIG. 7 as a reference for classifying as benign or malicious. When a pattern above the reference value is detected in the target application as shown in FIG. 7, the detected pattern is notified and it is determined as malicious. To the contrary, when a pattern below the reference value is detected, it is determined as a benign application.

Additionally, the experimental results show that the proposed classification method using API call graphs as features has the outstanding performance in terms of time and accuracy.

As malicious applications increase fast, the present disclosure proposes a method for detecting Android based malicious applications rapidly using a small number of features. Since Android applications are relatively easy to modify and redistribute, to prevent vulnerabilities, it is necessary to analyze the actual execution of malicious applications itself. Accordingly, the present disclosure directly detects and analyzes malicious behavior by detecting patterns frequently used in malicious applications based on the actual execution. Additionally, the present disclosure rapidly deals with malicious applications which are created and distributed fast.

The proposed scheme analyzes API call graphs containing the actual execution of malicious applications using CNN, and selects features more accurately and rapidly than human using the given weights when training. Since features with weights are selected and used in deep learning, relatively objective features are used.

Figure 8:
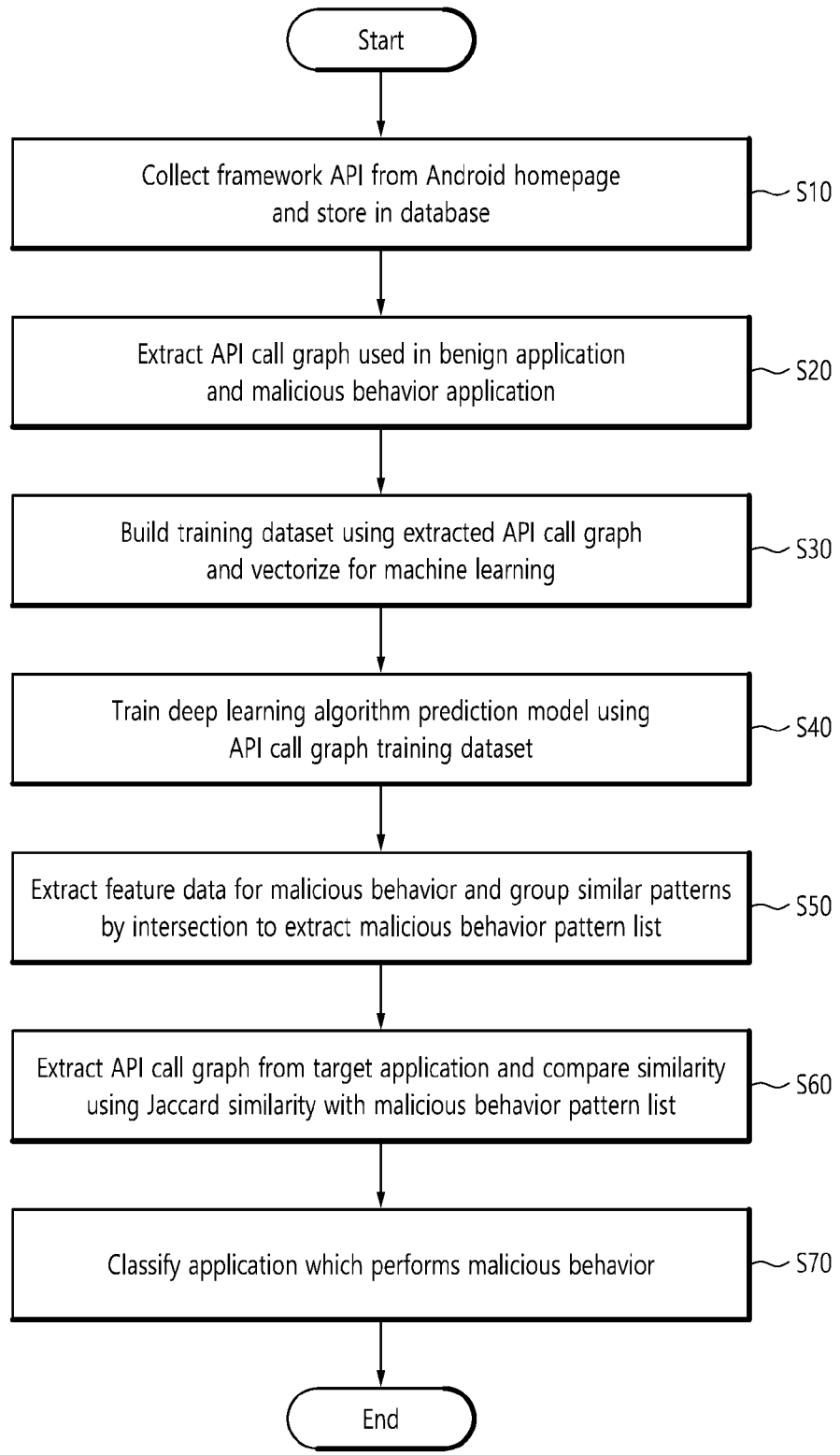
FIG. 8 is a flowchart of a mobile application malicious behavior pattern detection method based on API call graph extraction according to an embodiment of the present disclosure.

FIG. 8 is a flowchart of a mobile application malicious behavior pattern detection method based on API call graph extraction according to an embodiment of the present disclosure.

The mobile application malicious behavior pattern detection method based on API call graph (ACG) extraction according to this embodiment may be performed in substantially the same configuration as the device 10 of FIG. 1. Accordingly, the same reference sign is given to the same element as the device 10 of FIG. 1, and repetitious descriptions are omitted herein.

Additionally, the mobile application malicious behavior pattern detection method based on API call graph extraction according to this embodiment may be performed by software (application) for performing mobile application malicious behavior pattern detection based on API call graph extraction.

The present disclosure uses ACG representing usage relationships of APIs based on APIs containing the actual execution functions on a mobile application. Additionally, a malicious behavior pattern is extracted to analyze and detect malicious behavior itself by the deep learning technique using the ACG.

The present disclosure extracts the ACG using the taint analysis technique based on APIs for mobile applications. Subsequently, after training a prediction model using the deep learning algorithm, features are extracted using the deep learning visualization technique (Gradient-weighted Class Activation Map) capable of extracting features determined as important in the training.

The malicious behavior pattern that is common in malicious applications is detected using the extracted features. It is possible to detect malicious behavior itself, thereby achieving accurate and rapid malicious application pattern detection.

Referring to FIG. 8, the mobile application malicious behavior pattern detection method based on API call graph extraction according to this embodiment crawls and extracts framework API information from the Android homepage and stores the extracted framework API information (S10).

An ACG representing an API call flow is extracted from benign applications and applications which perform malicious behavior (S20). In this instance, the ACG also known as a call flow may be extracted using the taint analysis technique.

A training dataset for deep learning is generated and vectorized using the extracted ACG (S30). First, a training dataset is generated using all the extracted ACGs, and the generated training dataset is vectorized for deep learning.

A deep learning algorithm prediction model is generated by training with the vectorized training dataset (S40).

ACG features used in malicious behavior are extracted from the generated prediction model and a malicious behavior pattern is extracted from the intersection of malicious applications (S50).

ACG features used in malicious behavior using the deep learning visualization technique are extracted from the trained prediction model by the deep learning visualization technique, malicious applications having similar ACGs in the extracted ACG features are grouped and the intersection of malicious applications is calculated to extract a malicious behavior pattern.

Through similarity comparison between the extracted malicious behavior pattern and a pattern extracted from a target application (S60), an application which performs malicious behavior is classified (S70). The extracted malicious behavior patterns are listed, and a Jaccard similarity is measured between the malicious behavior pattern list and the ACG extracted from the target application.

The present disclosure classifies malicious applications by detecting the actual execution running in the malicious applications using ACG representing an API call flow, and analyzing malicious behavior patterns in the malicious applications using the deep learning technique. Accordingly, it is possible to detect malicious behavior itself, thereby preventing damage caused by malicious behavior by predicting and detecting malicious behavior.

The mobile application malicious behavior pattern detection method based on API call graph extraction may be implemented in the form of applications or program instructions that can be executed through a variety of computer components, and recorded in computer-readable recording media. The computer-readable recording media may include program instructions, data files and data structures, alone or in combination.

The program instructions recorded in the computer-readable recording media may be specially designed and configured for the present disclosure and may be those known and available to persons having ordinary skill in the field of computer software.

Examples of the computer-readable recording media include hardware devices specially designed to store and execute the program instructions, for example, magnetic media such as hard disk, floppy disk and magnetic tape, optical media such as CD-ROM and DVD, magneto-optical media such as floptical disk, and ROM, RAM and flash memory.

Examples of the program instructions include machine code generated by a compiler as well as high-level language code that can be executed by a computer using an interpreter. The hardware device may be configured to act as one or more software modules to perform the processing according to the present disclosure, and vice versa.

While the present disclosure has been hereinabove described with reference to the embodiments, those skilled in the art will understand that various modifications and changes may be made thereto without departing from the spirit and scope of the present disclosure defined in the appended claims.

INDUSTRIAL APPLICABILITY

The present disclosure classifies malicious applications by detecting the actual execution running in the malicious applications using an Application Programming Interface (API) call graph (ACG) representing an API call flow, and analyzing a malicious behavior pattern in the malicious applications using the deep learning technique. Accordingly, it is possible to detect malicious behavior of applications itself, and it is expected to prevent damage caused by malicious behavior by predicting and detecting malicious behavior.

DETAILED DESCRIPTION OF MAIN ELEMENTS

10: Mobile application malicious behavior pattern detection device
110: Framework API crawler
120: Framework API database
130: API call graph extractor
140: Training dataset vectorizer
150: Machine learner
160: Pattern extractor
170: Risk application classifier
142: Training dataset generator
144: Embedding vectorizer
162: API call graph feature extractor
164: Malicious behavior pattern extractor
172: Jaccard similarity comparator

The invention claimed is:

1. A mobile application malicious behavior pattern detection method based on Application Programming Interface (API) call graph extraction, the method comprising:

extracting an API Call Graph (ACG) representing a call flow of an API from benign applications and applications performing malicious behavior;

generating and vectorizing a training dataset for deep learning using the extracted ACG;

generating a deep learning algorithm prediction model by training with the vectorized training dataset;

extracting ACG features used in the malicious behavior from the generated prediction model and extracting a malicious behavior pattern from an intersection of the malicious applications; and classifying a target application performing malicious behavior through a similarity comparison between the extracted malicious behavior pattern and a pattern extracted from the target application, wherein the extracting the malicious behavior pattern comprises:

extracting the ACG features used in the malicious behavior using a deep learning visualization technique from the prediction model; and grouping malicious applications having similar ACGs among the extracted ACG features and calculating the intersection of the malicious applications to extract the malicious behavior pattern.

2. The method of claim 1, further comprising:
crawling and extracting framework API information from an Android homepage; and storing the extracted framework API information.

3. The method of claim 1, wherein the extracting the API Call Graph (ACG) comprises extracting the API Call Graph (ACG) representing the call flow using taint analysis.

4. The method of claim 1, wherein the generating and vectorizing the training dataset comprises:
generating the training dataset using all the extracted ACGs; and
vectorizing the generated training dataset for deep learning.

5. The method of claim 1, wherein the classifying the target application comprises listing the extracted malicious behavior patterns and measuring a Jaccard similarity between the malicious behavior pattern list and the ACG extracted from the target application.

6. A non-transitory computer-readable storage medium having recorded thereon a computer program for performing a mobile application malicious behavior pattern detection method based on Application Programming Interface (API) call graph extraction, wherein the method comprises:

extracting an API Call Graph (ACG) representing a call flow of an API from benign applications and applications performing malicious behavior;

generating and vectorizing a training dataset for deep learning using the extracted ACG;

generating a deep learning algorithm prediction model by training with the vectorized training dataset;

extracting ACG features used in the malicious behavior from the generated prediction model and extracting a malicious behavior pattern from an intersection of the malicious applications; and classifying a target application performing malicious behavior through a similarity comparison between the extracted malicious behavior pattern and a pattern extracted from the target application, wherein the extracting the malicious behavior pattern comprises:

extracting the ACG features used in the malicious behavior using a deep learning visualization technique from the prediction model; and grouping malicious applications having similar ACGs among the extracted ACG features and calculating the intersection of the malicious applications to extract the malicious behavior pattern.

7. A mobile application malicious behavior pattern detection device based on Application Programming Interface (API) call graph extraction, the device comprising:

an API call graph extractor extracting an API Call Graph (ACG) representing a call flow of an API from benign applications and applications performing malicious behavior;

a training dataset vectorizer generating and vectorizing a training dataset for deep learning using the extracted ACG;

a machine learner generating a deep learning algorithm prediction model by training with the vectorized training dataset;

a pattern extractor extracting ACG features used in the malicious behavior from the generated prediction model and extract a malicious behavior pattern from an intersection of the malicious applications; and a risk application classifier classifying a target application performing malicious behavior through a similarity comparison between the extracted malicious behavior pattern and a pattern extracted from the target application, wherein the pattern extractor comprises:

an API call graph feature extractor extracting the ACG features used in the malicious behavior using a deep learning visualization technique from the prediction model; and a malicious behavior pattern extractor grouping malicious applications having similar ACGs among the extracted ACG features and calculating the intersection of the malicious applications to extract the malicious behavior pattern.

8. The device of claim 7, further comprising:

a framework API crawler extracting framework API information from an Android homepage; and a framework API database to store the extracted framework API information.

9. The device of claim 7, wherein the API call graph extractor extracts the API Call Graph (ACG) representing the call flow using taint analysis.

10. The device of claim 7, wherein the training dataset vectorizer comprises:

a training dataset generator generating the training dataset using all the extracted ACGs; and an embedding vectorizer vectorizing the generated training dataset for deep learning.

11. The device of claim 7, wherein the risk application classifier comprises a Jaccard similarity comparator listing the extracted malicious behavior patterns and measuring a Jaccard similarity between the malicious behavior pattern list and the ACG extracted from the target application.

* * * * *